United States Patent [19]

Frank et al.

[11] 4,229,490
[45] Oct. 21, 1980

[54] NOVEL METHOD FOR CATALYST APPLICATION TO A SUBSTRATE FOR FUEL CELL ELECTRODES

[75] Inventors: Steven N. Frank, McKinney; James G. Frank, Garland, both of Tex.

[73] Assignee: Texas Instruments Incorporated, Dallas, Tex.

[21] Appl. No.: 938,748

[22] Filed: Sep. 1, 1978

[51] Int. Cl.$^2$ .................................. B05D 5/12
[52] U.S. Cl. ........................ 427/113; 204/290 R; 427/115; 427/122; 427/282; 427/369; 427/380; 427/374.1
[58] Field of Search ............... 204/290 R; 427/115, 427/113, 122, 282, 369, 253, 374 C, 374 R, 376 A, 376 E, 380

[56] References Cited

U.S. PATENT DOCUMENTS

| | | | |
|---|---|---|---|
| 3,854,994 | 12/1974 | Binder | 427/115 |
| 3,979,227 | 9/1976 | Katz | 427/115 |
| 4,000,006 | 12/1976 | Trocciola | 427/115 |
| 4,001,042 | 1/1977 | Trocciola | 427/115 |
| 4,054,687 | 10/1977 | Kunz | 427/115 |
| 4,090,978 | 5/1978 | Welsh | 427/115 |

*Primary Examiner*—Shrive P. Beck
*Attorney, Agent, or Firm*—Rene' Grossman; James T. Comfort; William E. Hiller

[57] ABSTRACT

An improved method of making a fuel cell electrode wherein a thin carbonized paper-like substrate is first impregnated with an electrolyte-repelling material, and thereafter a thin layer of catalyst material is screen printed thereupon.

9 Claims, 3 Drawing Figures

NOVEL METHOD FOR CATALYST APPLICATION TO A SUBSTRATE FOR FUEL CELL ELECTRODES

This invention relates to fuel cell electrodes and more particularly to a novel and improved method for producing fuel cell electrodes adapted for increased efficiency with gaseous constituents.

Fuel cell electrodes of the type generally herein contemplated are described in commonly assigned co-pending application Ser. No. 939,011; An "Improved Gas Electrode for Use in Fuel Cells" filed on even date herewith. As is described in that application, a gaseous fuel cell electrode of improved characteristics comprises a thin porous Teflon impregnated substrate to which is applied a graphite-Teflon mixture permeable to gas but impermeable to electrolyte solution. Upon the impregnated substrate there is disposed a catalyst material especially adapted for contact with an electrolyte.

Prior methods of fabricating fuel cell electrodes have included procedures not readily adaptable for mass production. Thus, for example, catalysts have been applied by spraying dispersed mixtures of the catalyst onto supporting members. Alternatively, mixtures of catalyst have been applied by the filter transfer method known to those skilled in the art. However, spraying has been found to be disadvantageous in that it is difficult to control thickness and uniformity, and the air brush spray nozzles required are prone to being clogged by the catalyst material. Moreover, the filter transfer techniques have required a number of complicated steps, albeit the filter transfer method appears to have been more amenable to commercial production than the technique of spraying. Nevertheless, in cooperative association with other steps required to fabricate electrodes, the aforementioned spray or filter transfer techniques have been found to be unattractive for mass production.

In addition to the foregoing, screen printing procedures have been proposed for applying silicon carbide matrixes to fuel cell parts, this being accomplished by the employment of low Teflon content compositions. Illustrating this are U.S. Pat. No. 4,000,006 granted to TROCCIOLA and ELMORE on Dec. 28, 1976, and U.S. Pat. No. 4,001,042 granted to TROCCIOLA, ELMORE and STOSAK on Jan. 4, 1977. However, when higher Teflon content was employed, as in a catalyst coat, the suspension was not stable, for polyethylene oxide or glycol, in combination with the catalyst components would not print because it balled up. Triton X-100 (Octyl phenoxy polyethoxy ethanol) has been generally believed to be a poison for hydrogen oxidation at platinum. However, in accordance with the hereinafter inventive concepts, we have discovered that it not only serves to overcome the aforementioned problem of suspension instability but in addition, can be employed in a way which does not result in catalyst poisoning.

It is one object of this invention to improve methods for producing fuel cell electrodes.

It is another object of this invention to simplify methods of production and to render such methods attractive for repetitive commercial production.

Accordingly, in accordance with one feature of the invention, a carbonized paper-like substrate is first impregnated with an electrolyte repelling material and thereafter a thin layer of catalyst material is applied by screen printing, thus resulting in a procedure which is highly controllable and adaptable for mass production.

These and other objects and features of the invention will be apparent from the following detailed description, by way of example, with reference to the drawing in which.

Figure 1:
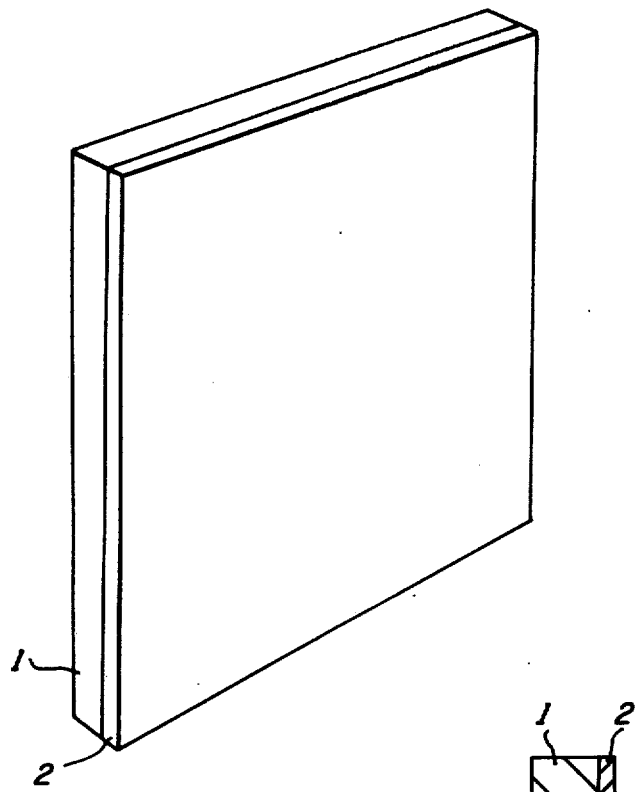
FIG. 1 is a perspective view of a fuel cell electrode constructed in accordance with the inventive methods hereof.

Now referring more particularly to the drawing, it will be observed that in FIG. 1 there is depicted a generally rectangular fuel cell electrode comprising a Teflon-impregnated carbonized substrate 1. Disposed upon a surface of substrate 1 is a thin layer of platinum black catalyst 2.

Figure 2:
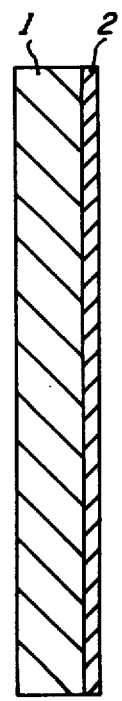
FIG. 2 is an end view of the construction depicted in FIG. 1.

It will now be observed that the electrode depicted in FIGS. 1 and 2 differs from the electrode depicted in the corresponding figures of the aforementioned copending patent application in that the latter electrode includes a layer of graphited Teflon between the substrate and catalyst. Although the principles of the invention hereof could be advantageously employed in applying the catalyst layer in the referenced application, it is described herein by way of example not including the intermediate layer.

The characteristics of both the substrate and the platinum black layer 2 are chosen so that they afford the qualities of permeability to gas from the substrate side, impermeability to electrolyte solution through the electrode from the catalyst side, while at the same time exhibiting very low electrical resistance therethrough in order that the fuel cell conversion efficiency may be good. Accordingly, the methods by which they are fabricated involve the cooperative association of a series of steps which in combination bring about particular physical characteristics required to achieve the aforementioned result.

Figure 3:
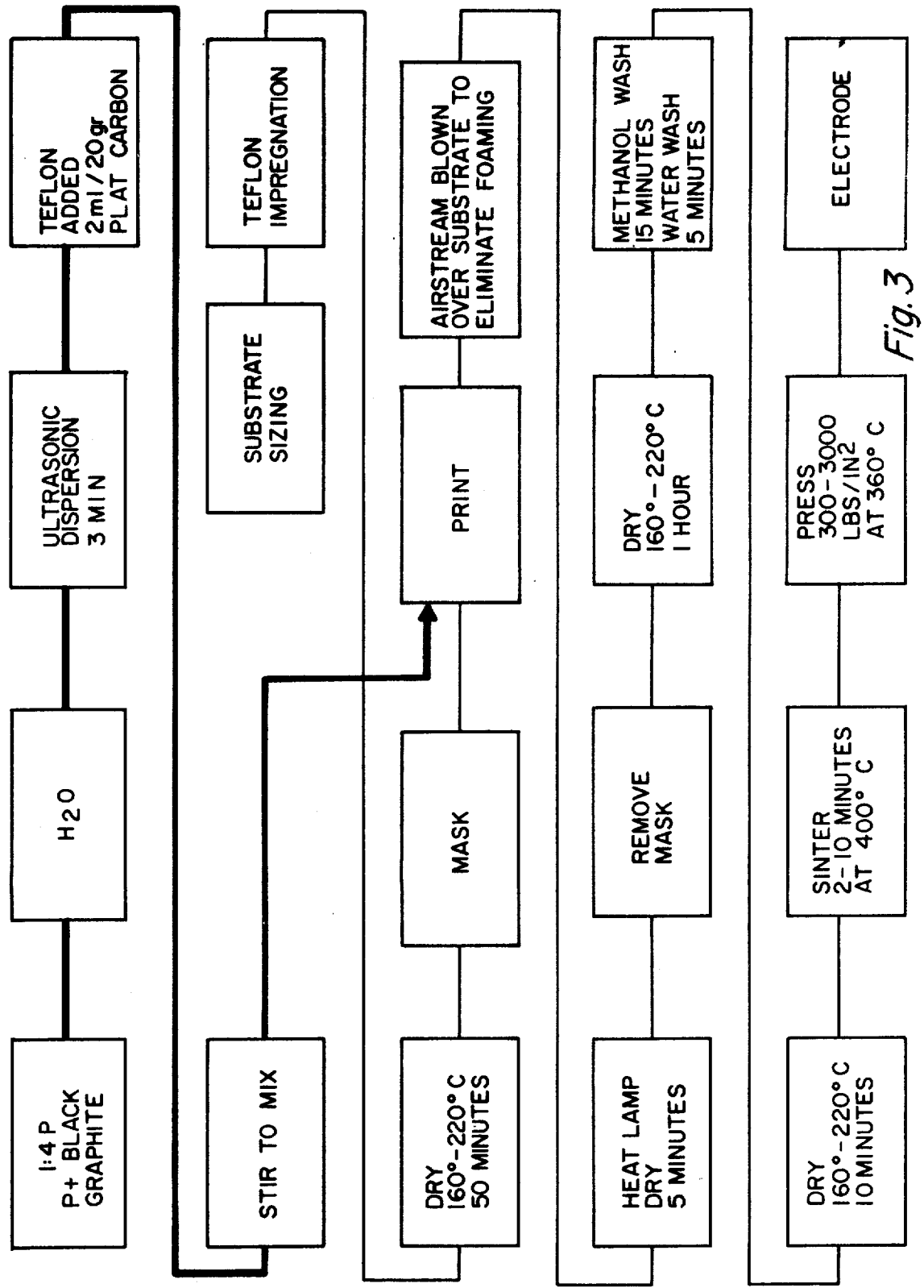
FIG. 3 is a flow diagram depicting the sequence of steps in the fabrication of the electrode of FIGS. 1 and 2.

Now referring to FIG. 3, it will be observed that there is therein depicted a flow diagram showing typical or representative steps for fabricating a fuel cell electrode as depicted in FIGS. 1 and 2.

Starting material comprised a graphitized carbon paper material of 50 to 60% open porosity and 11 to 13 mil thickness (commercially obtainable from the Super Temp Company and designated as fourth generation material). However, other porous material of similar porosity and characteristics would serve as well. The material was then sized to dimensions providing for the desired size of the electrode when finally completed. Next, it underwent Teflon impregnation. This was accomplished by dipping (immersing) the substrate in a Teflon solution having a content of approximately 60% by weight of Teflon. The substrate was then dried for about 50 minutes at temperatures of from 160°–220° C., whereupon it was then ready for printing.

Preparation of the mixture for printing was conducted by mixing platinum black and −325 mesh graphite in a ratio of one part platinum black to four parts graphite. Next, there was added a solution in the ratio of 44 milliliters of Triton X-100 (Octyl phenoxy polyethoxy ethanol), and 20 milliliters H₂O per 20 grams of the platinum black/graphite mix. This was then mixed thoroughly to obtain an essentially homogeneous character. (This may be accomplished ultrasonically, by actual stirring, or by any one of a number of other methods well known in the art.) The graphite material found particularly suitable for this application was Poco PXB-QS1 (−325 mesh).

After the foregoing mixture had been thoroughly blended, 12 milliliters of Teflon 30 was added per each 20 grams of the platinum black graphite mix. This was then further stirred to achieve a smooth and homogeneous mixture, and it was this mixture which was employed for printing layer 2 upon substrate 1.

Now returning to the Teflon impregnated substrate, it will be observed that the next step shown in FIG. 3 is that of masking. However, masking is optional, depending upon the means employed for positioning the substrate during printing. Thus, if the substrate is held in place by vacuum, masking may be necessary in order to prevent the platinum-graphite mixture from being drawn excessively into pores of the substrate itself. On the other hand, if vacuum positioning is not employed, it may not be necessary to mask the substrate prior to the printing step. In this example, masking was employed. The platinum-graphite mix was then screen printed onto an exposed surface of the substrate. This was accomplished by screening techniques well known in the art. After printing, a mild stream of air was blown over the surface to eliminate foaming. It was then dried for approximately five minutes under a conventional heat lamp, after which it was returned to the printer for an additional printing at approximately a 90° angle to the first printing and then further dried.

When multiple printing steps are indicated, it has been found advantageous for a second printing step to occur with the substrate reoriented at approximately 90° from its first location. This has been found to result in more uniform and homogeneous layer. In any event, application of a gentle stream of air to remove foaming and brief drying under the aforementioned heat lamp after each printing step has been found to be desirable.

After accomplishing the last printing step, the member was then dried for approximately one hour at a temperature between 160°–220° C. Thereafter, it was washed in methanol for approximately 15 minutes and then a water wash for approximately five minutes before being again dried for about 10 minutes at a temperature of from 160°–220° C. It was then heated to approximately 400° C. where it was maintained for between two and ten minutes in order to sinter the coating thoroughly into the substrate. Thereafter, it was hot pressed at a pressure of approximately 3,000 pounds per square inch and a temperature of approximately 360° C. of from 10 to 30 seconds. (Other examples were subjected to pressures ranging downward to 300 psi.) The catalytic coating was thus permanently affixed to the underlying layer. After the pressing step, the electrode was permitted to cool to room temperature, whereupon its processing was completed. Upon testing, the completed electrode was found to be equal to or superior in performance electrically.

It has been found that depending upon the desired thickness and the degree of uniformity desired, printing may be accomplished in single or multiple steps, and operative samples were prepared with both single and multiple printing.

It will now be evident that through the advantageous method of fabrication of electrodes in accordance with the inventive concepts hereinabove described, a fuel cell electrode of improved characteristics is produced, thus contributing to the attractiveness of the fuel cell as an electrical energy source.

Although the aforementioned illustration involves the use of certain types of materials, and although it is described by reference to specific times, temperatures and materials, it will be evident to those skilled in the art that other similar parameters and materials may be employed without departing from the spirit and scope of the inventive concepts.

The words and expressions employed are intended as terms of description and not of limitation, and there is no intention in the use thereof of excluding any equivalents, but on the contrary, it is intended to include any and all equivalents, adaptations, and modifications that may be employed without departing from the spirit and scope of the invention.

What is claimed is:

1. The method of making an improved fuel cell electrode comprising the steps of selecting and sizing a thin porous graphitized carbon member, impregnating said member with Teflon, drying said member, mixing platinum black and minute particles of graphite in a ratio of about one part platinum black to four parts graphite, adding a solution in the ratio of about 44 milliliters of Triton X-100 (Octyl phenoxy polyethoxy ethanol) and 20 milliliters of water for each 20 grams of the platinum black/graphite to produce a first mix, adding about 12 milliliters of Teflon 30 to each 20 grams of said first mix to produce a second mix, blending said second mix, screen printing said second mix upon a major surface of the member to produce a coating comprising platinum black catalytic material and finely divided graphite, drying said coating and sintering said coating.

2. The method of claim 1 in which the impregnation with Teflon is by immersion in a solution having about 60 percent by weight of Teflon.

3. The method of claim 1 in which said screen printing is accomplished with said material first oriented in a first predetermined position for a first printing, and then reoriented at 90 degrees for a second printing.

4. The method of claim 1 in which said porous material is carbon paper.

5. The method of claim 4 in which the impregnation with Teflon is by immersion in a solution having about 60 percent by weight of Teflon.

6. The method of making an improved fuel cell electrode comprising the steps of selecting and sizing a thin porous graphitized carbon paper member of from 11 to 13 mils thickness, dipping said member in a solution of Teflon to impregnate said member therewith, drying said member by heating said member to about 160°–230° C. for about 50 minutes, mixing platinum black and minute graphite particles in a ratio of about one part platinum black to four parts graphite, adding a solution in the ratio of about 44 milliliters of Triton X-100 (Octyl phenoxy polyethoxy ethanol), and 20 milliliters of water for each 20 grams of the platinum black/graphite to produce a first mix, adding about 12 milliliters of Teflon 30 to each 20 grams of said first mix to produce a second mix, mixing said second mix, screen printing said second mix upon a major surface of the member to produce a coating comprising platinum catalytic material and finely divided graphite, drying said coating by heating said member to about 160°–230° C. for about one hour, washing said member, heating said member to sinter said coating, pressing said member while hot, and cooling said member.

7. The method of claim 6 wherein said last mentioned heating of said member to sinter said coating is at approximately 400° C. for a period of from two to ten minutes.

8. The method of claim 6 wherein said pressing occurs at pressures of from 300 to 3,000 pounds per square inch.

9. The method of claim 7 wherein said pressing occurs at pressures of from 300 to 3,000 pounds per square inch.

* * * * *